M. M. BRUNNER.
Improvement in Road-Scrapers.
No. 131,996.  Patented Oct. 8, 1872.
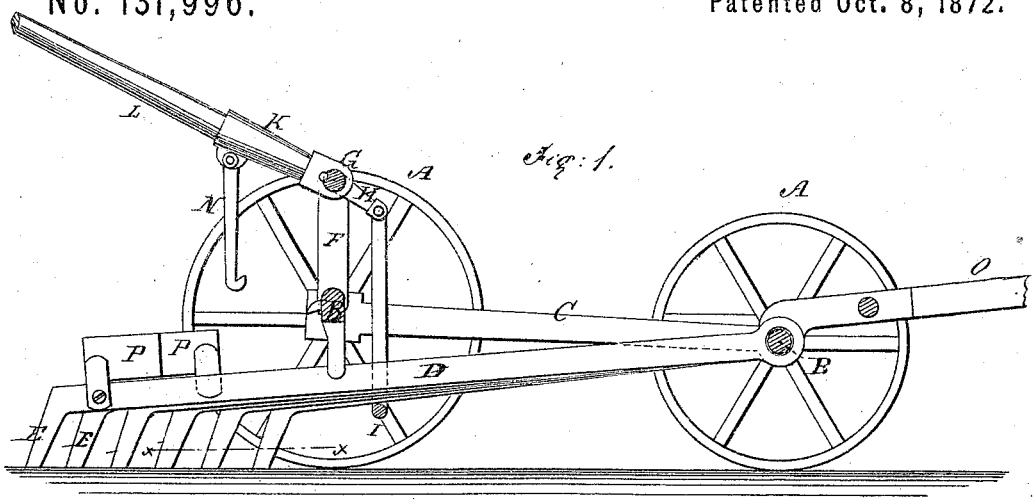
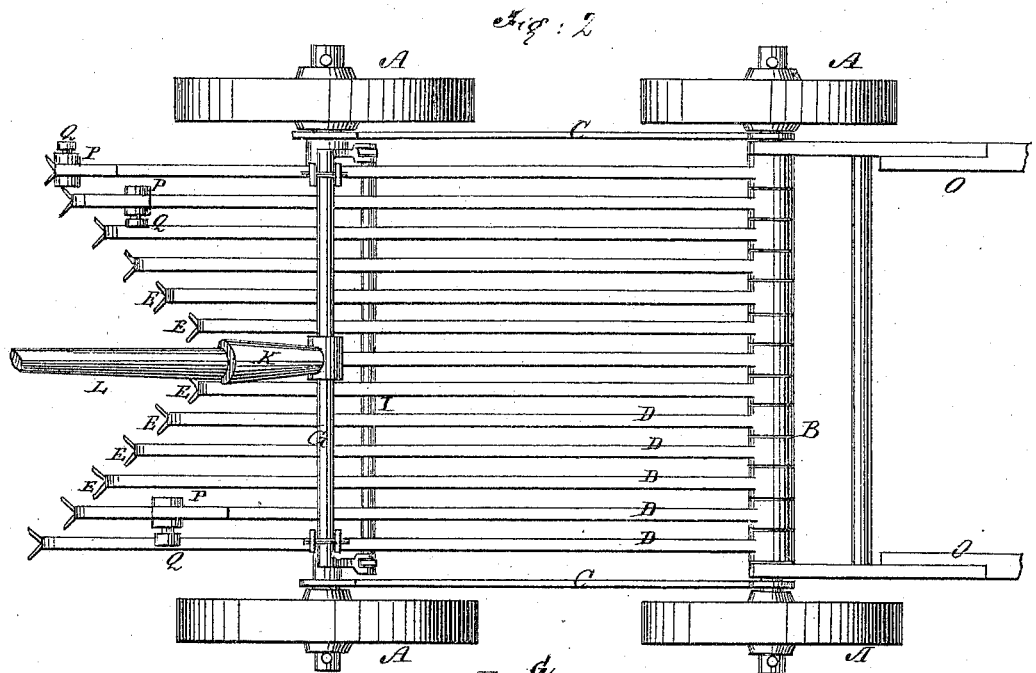
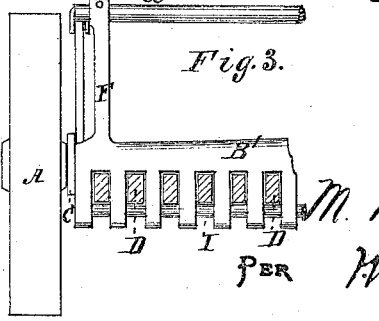
Witnesses:
Chas. Nida
N. A. Graham
Inventor:
M. M. Brunner
per
Attorneys.

UNITED STATES PATENT OFFICE.

MICHAEL M. BRUNNER, OF ORANGE, NEW JERSEY.

IMPROVEMENT IN ROAD-SCRAPERS.

Specification forming part of Letters Patent No. 131,996, dated October 8, 1872.

*To all whom it may concern:*

Be it known that I, MICHAEL M. BRUNNER, of Orange, in the county of Essex and State of New Jersey, have invented a new and useful Improvement in Machines for Scraping Roads, of which the following is a specification:

The object of this invention is to provide a convenient machine for scraping and leveling roads, more especially designed for carriage-roads in cemeteries and private grounds, but applicable to all similar roadways; and it consists in a series of adjustable bars with triangular scrapers thereon, and in the parts connected therewith, hereinafter more fully set forth and described.

In the accompanying drawing, Figure 1 represents a vertical longitudinal section of the machine; Fig. 2 is a top or plan view; and Fig. 3 is a detailed view, showing the construction of the rear axle of the machine, the hinged scraping-bars being in section.

Similar letters of reference indicate corresponding parts.

This machine is mounted on four wheels, A, the axles of which, B B', are connected together by the bars C C adjacent to the hubs of the wheels. D represents bars, which are confined to the forward axle by means of eyes on the bars, through which the axle passes as seen in the drawing. These bars extend back past the rear wheels, the end of each bar being turned or bent downward to form an obtuse angle and resembling a cultivator-tooth, as seen in Fig. 2 at 3. These scraping-teeth may be made separate and be attached to the bars by means of screws or otherwise, if desired.

When the machine is in use these ends rest upon the ground, and as the machine is drawn along they scrape the ground and tear up the grass and weeds. When they meet an obstruction (a fast stone for instance) their angle, in regard to the surface of the ground, is such that the obstructed bar will be raised by the contact and will pass over the obstruction and instantly drop by its own gravity to the surface of the road. The bars are of varying lengths, and are arranged so that their rear ends (taken as a whole) form about a right angle, as seen in Fig. 2.

The rear axle B' of the machine is cast or made with a pendent partition piece between each pair of the bars, as shown in Fig. 3, which keep them at a uniform distance apart while they are allowed to rise and fall according as the surface of the ground may vary, or to pass over obstructions. Above the rear axle, supported by the two stands F (on the axle) is a rock-shaft, G, with an arm, H, at each end. These arms are at right angles with the shaft. Beneath the bars is a transverse bar, I, connected at each end to the arms H by the rods J. (See Fig. 1.) K is a socket on the rock-shaft G. L is a lever in the socket, by which means the shaft is operated. The arrangement is such that when the lever is pulled down the arms H H and bar I are thrown up, which raises the scrapers from the ground. The man who manages the machine walks behind and handles the lever and raises the bars from the ground or lets them scrape the surface at pleasure. N is a hook attached to the lever-socket, which hooks onto a lug on the axle, by which means the lever is held down without hand-work—as, for instance, when going to or from the place of work. O represents the thills, to which the horse is attached. The scrapers are so spread at the bottom that although the bars are separated the scraping-teeth cover the entire surface, and leave the ground level and clean when they are not obstructed by roots or stones. P represents weights on the rear ends of the bars, (more or less in number) and of any desired weight. The weight is held by a set-screw, Q, and may be adjusted on the bar as may be desired. Each bar may have a weight, and as they are moved from or toward the scrapers the effect will be increased or diminished.

Having thus described my invention, I claim as new and desire to secure by Letters Patent—

1. In a machine for scraping roads, the hinged bars D bent at their rear ends to form an obtuse angle, and provided with the scraping-teeth E, constructed as described.

2. The combination of the axle B' provided with the vertical partition pieces or guide-bars and the bar I connected with the lever L, as shown and described.

3. The weights P, in combination with the bars D, as and for the purposes described.

MICHAEL M. BRUNNER.

Witnesses:
T. B. MOSHER,
W. A. GRAHAM.